July 15, 1924.
A. P. GEER
THRUST BEARING
Filed Oct. 10, 1922
1,501,447
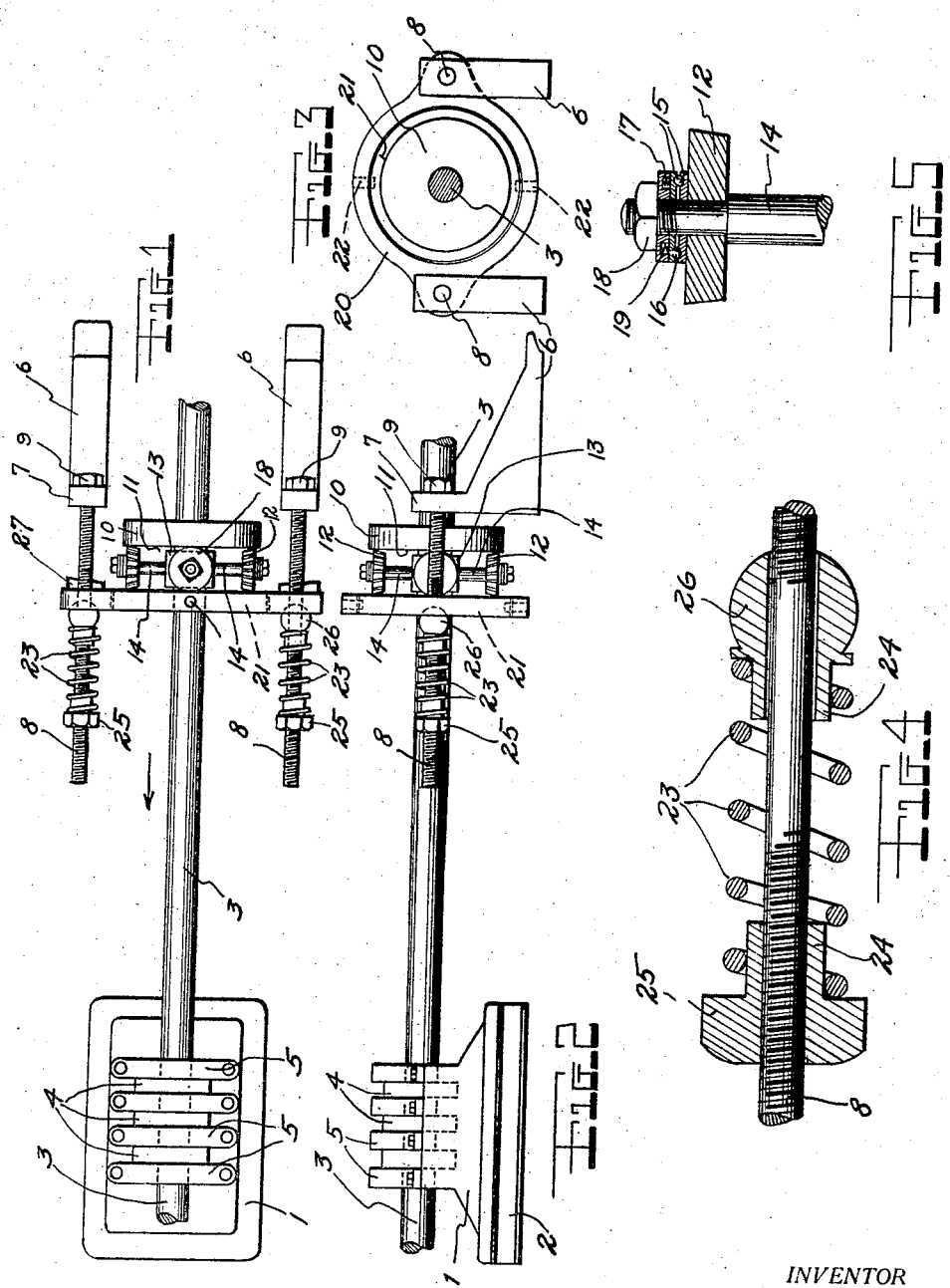
INVENTOR
*A.P. Geer*
BY
*J. Lederman*
ATTORNEY Patented July 15, 1924.

1,501,447

UNITED STATES PATENT OFFICE.

ALBERT P. GEER, OF NEW LONDON, CONNECTICUT.

THRUST BEARING.

Application filed October 10, 1922. Serial No. 593,521.

*To all whom it may concern:*

Be it known that I, ALBERT P. GEER, citizen of the United States, and resident of New London, in the county of New London and State of Connecticut, have invented certain new and useful Improvements in Thrust Bearings, of which the following is a specification.

This invention relates to thrust bearings for the horizontal propeller shafts of marine engines, and the main object is to provide a bearing which greatly decreases friction by eliminating an appreciable amount of longitudinal strain from the main bearing of the ship.

Another object is to provide an auxiliary thrust bearing for a ship propeller shaft which takes up the end-wise pressure or thrust, and associate means on the auxiliary thrust bearing compensating for the amount of pressure being received while the ship is forging ahead, said pressure being variable within certain limits.

These and other objects will become apparent in the description below, in which characters of reference refer to like-named parts in the drawing.

Referring briefly to the drawing, Figure 1 is a top plan view of the auxiliary thrust bearing as applied to a propeller shaft.

Figure 2 is a side elevational view of the same.

Figure 3 is an end elevational view of Figure 2.

Figure 4 is an enlarged sectional elevational view of one of the thrust compensating spindles.

Figure 5 is an enlarged sectional elevational view of the thrust pressure absorbing rollers.

Describing the drawing in detail, the numeral 1 indicates the bed of the main bearing which is secured to the frame work 2 of the ship by suitable means. Said base is of substantial design so as to support the propeller shaft 3 with a minimum of vibration. The portion of the shaft which is supported on the base has a plurality of adjacently formed annular flanges 4 thereon which ride in corresponding channels in the base, said flanges preventing endwise or longitudinal displacement of the shaft. The base 1 has caps 5 secured thereto by suitable bolts and prevent jumping of the shaft. The main bearing just described is generally used on all present day type of boats, and after having been in use for a short time becomes very hot. The friction produced by this condition is roughly computed as of $\frac{1}{7}$ of the total power required to propel the boat. The auxiliary bearing which will hereinafter be described is primarily designed to reduce the thrust on the main bearing as much as possible and thereby conserve the lost power for propulsion of the ship.

This auxiliary bearing has for support means a pair of triangular pedestals 6 which are rigidly secured to the frame of the ship, and on both sides of the shaft. A vertical projection 7 on each pedestal receives one end of a horizontal spindle 8, the latter being threaded thruout its length and is secured in place by the nuts 9.

A relatively strong flange 10 is rigidly formed on the propeller shaft 3 beyond the extending ends of the spindles and the flat surface 11 thereon provides a rolling face for the fluted rollers 12 which have their peripheral surfaces slightly tapered, the fluting thereon being provided to present a grip surface to the flange 10. These rollers, four in number, are mounted on a form of spider which has a central hub 13 from which a plurality of short shafts 14 extend radially. The outer ends of said shafts are shouldered and receive the fluted rollers 12. Each of the latter are surmounted by a pair of ball races 15 between which the balls 16 are located. An additional washer 17 mounted on top of the upper ball race is retained in place by the nut 18 and has a plurality of springs 19 housed in suitable recesses therein, said springs having the tendency of urging the upper ball race into intimate contact with the lower ball race.

An elongated plate 20 is slidably mounted on the spindles 8, and is provided with a large orifice concentric about the propeller shaft in which a collar 21 is pivotally mounted on the trunnion pins 22, the latter being on the vertical centre. This collar is continually urged in the direction of the rollers by the tension of the expansion springs 23, the latter being mounted on the spindles 8. Said springs 23 are mounted on collars 24 which are continuations or projections of threaded adjusting nuts 25 and ball headed slip nuts 26. The springs are mounted between each set of these nuts and are thereby prevented from injuring the threads of the spindle 8. The ball headed slip nuts fit into spherical recesses formed in the plate 20 and continually urge the latter in the opposite direction.

A propeller shaft when rotating is subject to various strains both continual and intermittent. When a ship is riding a smooth sea the forward thrust of the shaft is continual and builds up the frictional resistance to rotation to a large degree, with a consequent loss of useful power to a corresponding degree. This thrust has been heretofore received and absorbed by the main bearing. By placing the auxiliary bearing between the main bearing and propeller, an appreciable amount of thrust is compensated for by the auxiliary bearing in such manner that the power saved is a great factor and should be carefully noted.

Assuming that the thrust is in the direction indicated by the arrow in Figure 1, the shaft flange 10 will be displaced longitudinally, and in the same direction. The rollers 12 carried on the spider will be urged in the direction of the plate 20. The latter will be urged against the tension of the springs 23, which become stronger as they are proportionately depressed. The initial tension of the springs 23 can be changed or varied by manipulation of the nuts 25. From the foregoing it is apparent that a great amount of longitudinal thrust is taken up by the auxiliary bearing.

It is to be noted that the rollers are mounted on the spider with a view toward decreasing the frictional resistance to a minimum. The peripheral faces of said rollers are tapered toward the center of shaft 3 causing a tendency of the rollers to shift radially outwardly after the principle of centrifugal force. When rotating on the face of the ball races 14 the resultant friction will be decreased to a minimum by the balls 16.

This invention is an improvement over a similar invention patented by the inventor on May 1, 1900, No. 648,661.

Keys 27 are rigidly fixed in the threaded spindles 8 and serve as a means for limiting the end-wise movement of the plate 20 and collar 21.

I claim:—

1. In combination with a shaft and main bearing therefor, an auxiliary thrust bearing comprising a pair of pedestals, threaded spindles, one end of each spindle being supported in said pedestals, the opposite ends of said spindles being free, a plate member supported on said spindle, a large flange on the shaft adjacent said plate and means for absorbing the end-wise thrust of said shaft.

2. In combination with a shaft and main bearing therefor, said shaft having a heavy flange thereon, pedestals mounted adjacent the shaft, horizontal threaded spindles projecting from said pedestals, a plate member supported on said spindle, a pivoted collar supported by said plate, a spider mounted on the shaft between the flange and collar, rollers on said spider, and means for urging said plate into contact with the rollers.

3. In combination with a shaft and main bearing therefor, a flange on said shaft, pedestals adjacent said shaft having horizontal threaded spindles, a plate supported on said spindles having a collar pivoted therein, nut members on said spindles, a spring between the plate and nut members, said springs adapted to urge said plate and collar toward the shaft flange, a spider rotatably mounted on said shaft between the flange and the collar adapted to reduce end-wise friction, fluted rollers rotatably mounted on said spider, the peripheries of said rollers being inclined, and means for reducing the frictional resistance to rotation of said rollers.

4. In combination with a shaft and main bearing therefor, a flange on said shaft, a plate member adjacent said flange, a collar pivoted in said plate, a hub rotatable on said shaft between the flange and collar, rods radially spaced thereon, rollers surmounting said rods and adapted to ride upon the surfaces presented by the flange and collar, springs adapted to urge said plate and collar toward the rollers, means for varying the tension of said springs, means for reducing the frictional resistance to rotation of said rollers, and means for limiting the end-wise movement of the collar.

5. In combination with a shaft and bearing therefor a flange rigid on said shaft, pedestals adjacent said shaft having horizontal threaded spindles, a plate supported on said spindles, a collar pivoted in said plate, said shaft passing thru said collar, nuts on said spindles, springs between the plate and nuts, said springs adapted to urge said plate and collar toward the shaft flange, a spider rotatably mounted on said shaft between the flange and the collar, fluted rollers mounted on radiating ends of said spider, nuts on the ends of said spider retaining the rollers in place, ball races mounted between the nuts and the rollers, additional washers covering the upper ball race of each set and having recesses therein, springs mounted in said recesses adapted to urge the upper ball races toward the rollers.

Signed at New York, in the county of New York and State of New York, this 3rd day of October A. D. 1922.

ALBERT P. GEER.